(12) United States Patent
Liu et al.

(10) Patent No.: US 8,711,752 B2
(45) Date of Patent: Apr. 29, 2014

(54) DISTRIBUTED MULTICAST PACKET REPLICATION WITH CENTRALIZED QUALITY OF SERVICE

(75) Inventors: Tong Liu, Acton, MA (US); Yie-Fong Dan, Cupertino, CA (US); Pawel Sowinski, Northborough, MA (US); Chad Mikkelson, Arlington, MA (US); William Beebee, Lowell, MA (US)

(73) Assignee: Cisco Technology, Inc., San Jose, CA (US)

( * ) Notice: Subject to any disclaimer, the term of this patent is extended or adjusted under 35 U.S.C. 154(b) by 752 days.

(21) Appl. No.: 12/686,314

(22) Filed: Jan. 12, 2010

(65) Prior Publication Data

US 2011/0170542 A1    Jul. 14, 2011

(51) Int. Cl.
*H04H 20/71* (2008.01)

(52) U.S. Cl.
USPC .......................................... 370/312; 370/390

(58) Field of Classification Search
None
See application file for complete search history.

(56) References Cited

U.S. PATENT DOCUMENTS

| 7,263,099 | B1 * | 8/2007 | Woo et al. ..................... 370/390 |
| 7,391,772 | B2 * | 6/2008 | Hooper et al. ................ 370/390 |
| 7,480,246 | B2 * | 1/2009 | Agarwal et al. ............... 370/235 |
| 7,626,985 | B2 * | 12/2009 | Wong ............................ 370/390 |
| 2002/0018469 | A1 * | 2/2002 | Davis ............................ 370/390 |
| 2004/0264464 | A1 * | 12/2004 | Wong ............................ 370/390 |
| 2005/0036502 | A1 * | 2/2005 | Blanc et al. ................... 370/412 |
| 2008/0069100 | A1 | 3/2008 | Weyman et al. |
| 2011/0170542 | A1 * | 7/2011 | Liu et al. ....................... 370/390 |

* cited by examiner

*Primary Examiner* — Robert Wilson
(74) *Attorney, Agent, or Firm* — Leon R. Turkevich (57) ABSTRACT

A system includes a forwarding engine to schedule when replicas of a received multicast packet are forwarded towards one or more multicast recipients. The system also includes an egress interface device to replicate the multicast packet and forward the multicast packet replica towards the one or more multicast recipients when prompted by the forwarding engine based on the scheduling.

15 Claims, 6 Drawing Sheets

Figure 5A  MULTICAST PACKET

Figure 5B  MULTICAST PACKET WITH CONTROL SIGNALING

Figure 5C  MULTICAST EGRESS HEADER

Figure 6

DISTRIBUTED MULTICAST PACKET REPLICATION WITH CENTRALIZED QUALITY OF SERVICE

FIELD OF THE INVENTION

This invention relates generally to network communications.

BACKGROUND

Multicasting is a form of communication that allows a source device to send a single packet to a network for distribution to multiple destination endpoints. The network usually includes at least one multicast-enabled router or other switching device capable of replicating the packet and forwarding the replicated packets towards the multiple destination endpoints.

Multicast-enabled routers typically include a centralized controller to replicate received packets, and one or more outbound interfaces to forward the packet and its copies towards destination endpoints over various data links. To reduce congestion over the data links, the centralized controller can implement various quality-of-service (QoS) features, such as packet scheduling and packet shaping, which can control the flow of replicated packets from the outbound interfaces.

As multicasting becomes more prevalent, such as in video-on-demand (VOD) and Internet Protocol Television (IPTV) applications, multicast packet traffic will consume routing resources increasingly. For instance, a backplane of the router can become heavily utilized when transferring replicated packets from the centralized controller to the outbound interfaces. In an attempt to preserve backplane bandwidth, some system designers have pushed multicast replication and the associated quality of service features to the processors on the outbound interfaces of the routers. Although this distributed router configuration helps to reduce bandwidth consumption of the backplane, it comes with a dramatically increased interface cost and with a loss of centralized quality of service control.

DETAILED DESCRIPTION

Overview

In network communications, a multicast-enabled edge router can replicate multicast packets for distribution to various multicast recipients. The multicast-enabled edge router can include a forwarding engine to implement various quality-of-service (QoS) features, such as scheduling when replicas of a received multicast packet are to be forwarded towards one or more multicast recipients. The multicast-enabled edge router can include at least one egress interface device to replicate at least a portion of the multicast packet and forward the replica multicast packets towards the multicast recipients when prompted by the forwarding engine. With the forwarding engine and egress interface device, the multicast-enabled edge router can implement a distributed multicast packet replication scheme, while retaining a centralized quality of service architecture. Embodiments are shown and described below in greater detail.

DESCRIPTION

Figure 1:
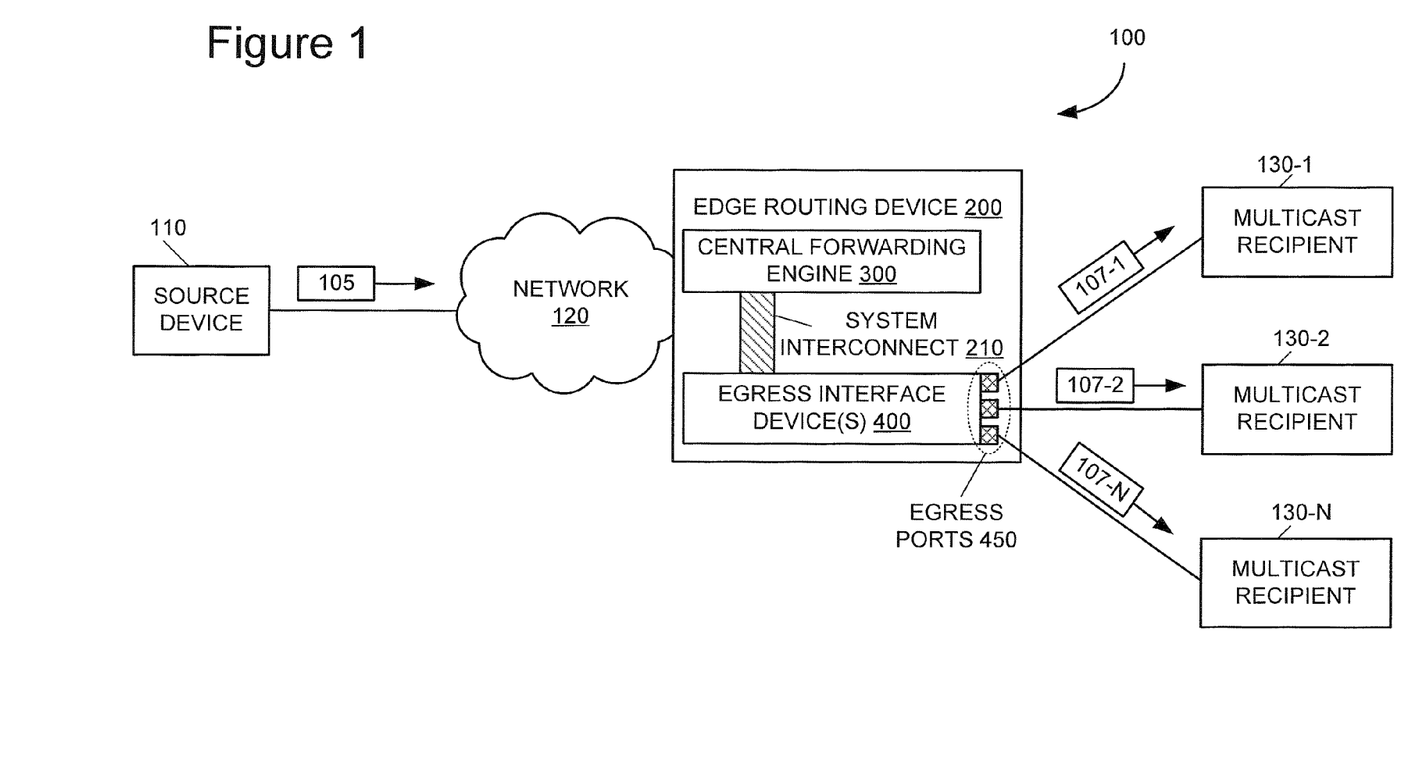
FIG. 1 illustrates an example networking system that includes a multicast-enabled edge router having distributed packet replication and centralized quality of service features.

FIG. 1 illustrates an example networking system 100 that includes a multicast-enabled edge router having distributed packet replication and centralized quality of service features. Referring to FIG. 1, the networking system 100 includes a source device 110 to send a multicast packet 105 to a network 120 for distribution to a multicast group that includes multiple recipients 130-1 to 130-N. The source device 110 can be a server, intermediate gateway, endpoint device, or other source of multicast traffic capable of sending a multicast packet 105 to the network 120 for distribution to a multicast group. The multiple recipients 130-1 to 130-N can be any device capable of receiving multicast traffic from the network 120. The network 120 can be a packet-switched network having one or more network nodes to forward, switch, and/or route the multicast packet 105 towards the multiple recipients 130-1 to 130-N.

The networking system 100 can include an edge routing device 200 to receive the multicast packet 105, for example, from another networking device in the network 120. The edge routing device 200 can replicate the multicast packet 105 and control distribution of the replicated multicast packets 107-1 to 107-N towards the multiple recipients 130-1 to 130-N.

The edge routing device 200 includes a central forwarding engine 300 to perform packet processing on the received multicast packet 105, such as layer 2 or layer 3 header processing for routing or switching applications. The central forwarding engine 300 can also apply various quality-of-service (QoS) features, such as packet scheduling and packet shaping, to flows of replica packets 107-1 to 107-N from the edge routing device 200. These quality-of-service features can control when the multicast packet 105 is replicated and schedule when the replicated multicast packets 107-1 to 107-N are sent to the multiple recipients 130-1 to 130-N to help reduce congestion and maintain customer Service Level Agreement (SLA) guarantees on outgoing data links.

The edge routing device 200 includes egress interface device(s) 400 to receive the multicast packet 105 from the central forwarding engine 300. The egress interface device(s) 400, when prompted by the central forwarding engine 300 based on central quality-of-service features, can generate the replicated multicast packets 107-1 to 107-N from the multicast packet 105 and can transmit the replicated multicast packets 107-1 to 107-N towards the multiple recipients 130-1 to 130-N via one or more egress ports 450. The egress interface device 400, in some embodiments, can be a distributed group of outbound network interface devices or network line cards that are each capable of replicating the multicast packet 105 and transmitting the replicas 107-1 to 107-N towards the multiple recipients 130-1 to 130-N. Embodiments of the edge routing device 200 and its distributed multicast replication with centralized quality-of-service control will be discussed below in greater detail. Although FIG. 1 shows the forwarding engine 300 and the egress interface device(s) 400 colocated in the edge routing device 200, in some embodiments, they can be distributed in different devices.

Figure 2:
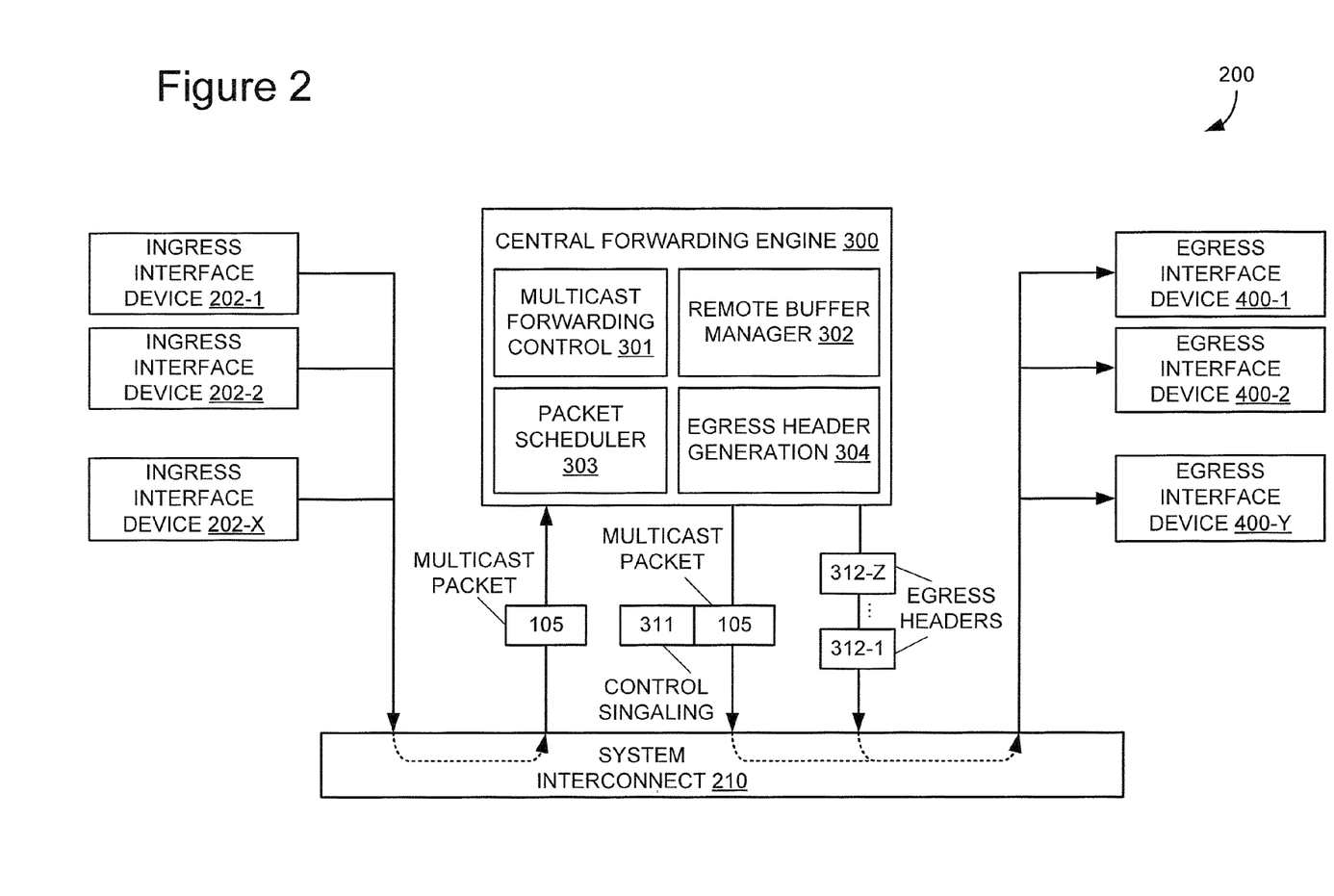
FIG. 2 illustrates example embodiments of the multicast-enabled edge router shown in FIG. 1.

FIG. 2 illustrates example embodiments of a multicast-enabled edge router shown in FIG. 1. Referring to FIG. 2, the edge routing device 200 includes several interface devices, for example, ingress interface devices 202-1 to 202-X to receive multicast traffic, such as multicast packet 105, from the network 120, and egress interface devices 400-1 to 400-Y to transmit replicated multicast packets 107-1 to 107-N towards various multiple recipients 130-1 to 130-N. The ingress interface devices 202-1 to 202-X and egress interface devices 400-1 to 400-Y can receive and send packetized communication, respectively, over various ports or links that they host or serve. These interface devices can be distributed over the edge routing device 200 and/or incorporated into one or more network line cards. Although FIG. 2 shows the ingress interface devices 202-1 to 202-X being grouped separately from the egress interface devices 400-1 to 400-Y, in some embodiments, they can be grouped together, or their orientation and/or grouping can be interleaved or configured variously.

The ingress interface devices 202-1 to 202-X can transfer multicast traffic received from the network 120 over the system interconnect 210 to the central forwarding engine 300 for processing. After receipt of the multicast packet 105, the central forwarding engine 300 can determine forwarding information for the multicast packet 105, for example, identifying which of the egress interface devices 400-1 to 400-Y can forward the replicated multicast packets 107-1 to 107-N on a path to the multiple recipients 130-1 to 130-N based on a next hop egress link list. In some embodiments, the central forwarding engine 300 can include a multicast forwarding control 301 to extract data from headers of the multicast packet 105, such as a multicast destination address, and determine which of the multiple recipients 130-1 to 130-N has subscribed to a particular multicast group and/or which of the egress interface device(s) 400 can forward the replicated multicast packets 107-1 to 107-N on a path to the multiple recipients 130-1 to 130-N.

The central forwarding engine 300 can send a master copy of the multicast packet 105 and corresponding multicast replication control signaling 311 to the identified egress interface devices 400-1 to 400-Y over the system interconnect 210. The multicast replication control signaling 311 can include a sequence number that corresponds to the multicast packet 105.

In some embodiments, the central forwarding engine 300 can include a remote buffer manager 302 to determine a buffer index, which is a buffer location in the identified egress interface devices 400-1 to 400-Y to store the multicast packet 105. The central forwarding engine 300 can send the buffer index to the identified egress interface devices 400-1 to 400-Y, for example, in multicast replication control signaling 311. This remote management of buffers in the egress interface devices 400-1 to 400-Y allows the central forwarding engine 300 to signal the egress interface devices 400-1 to 400-Y which multicast packet to replicate based on the buffer location the packet is stored within the egress interface devices 400-1 to 400-Y.

The central forwarding engine 300 includes an egress header generation 304 to generate one or more egress headers 312-1 to 312-Z to be sent to the identified egress interface devices 400-1 to 400-Y over the system interconnect 210. The egress headers 312-1 to 312-Z can include link-layer information utilized by the egress interface devices 400-1 to 400-Y to transmit replicated multicast packets 107-1 to 107-N from the edge routing device 200. The egress headers 312-1 to 312-Z can include the sequence number and the buffer index, allowing the egress interface devices 400-1 to 400-Y to locate the master copy of a packet to be replicated by the egress interface devices 400-1 to 400-Y and to ensure the master copy corresponds to the egress headers 312-1 to 312-Z.

The central forwarding engine 300 can send egress headers to the identified egress interface devices 400-1 to 400-Y, which prompts the egress interface devices 400-1 to 400-Y to generate the replicated multicast packets 107-1 to 107-N from the master copy of the multicast packet 105 and forward them to the multiple recipients 130-1 to 130-N.

The central forwarding engine 300 includes a packet scheduler 303 to perform a quality-of-service analysis on multicast traffic to be transmitted from the egress interface devices 400-1 to 400-Y. This centralized quality-of-service analysis can be performed by the central forwarding engine 300 on a per port basis on behalf of the egress interface devices 400-1 to 400-Y. In some embodiments, the central forwarding engine 300 can control the timing of the transmissions of replicated packets 107-1 to 107-N from the egress interface devices 400-1 to 400-Y based on when the egress headers 312-1 to 312-Z are sent to the egress interface devices 400-1 to 400-Y. Embodiments of the central forwarding engine 300 and the egress interface devices 400-1 to 400-Y will be described below in greater detail.

Figure 3:
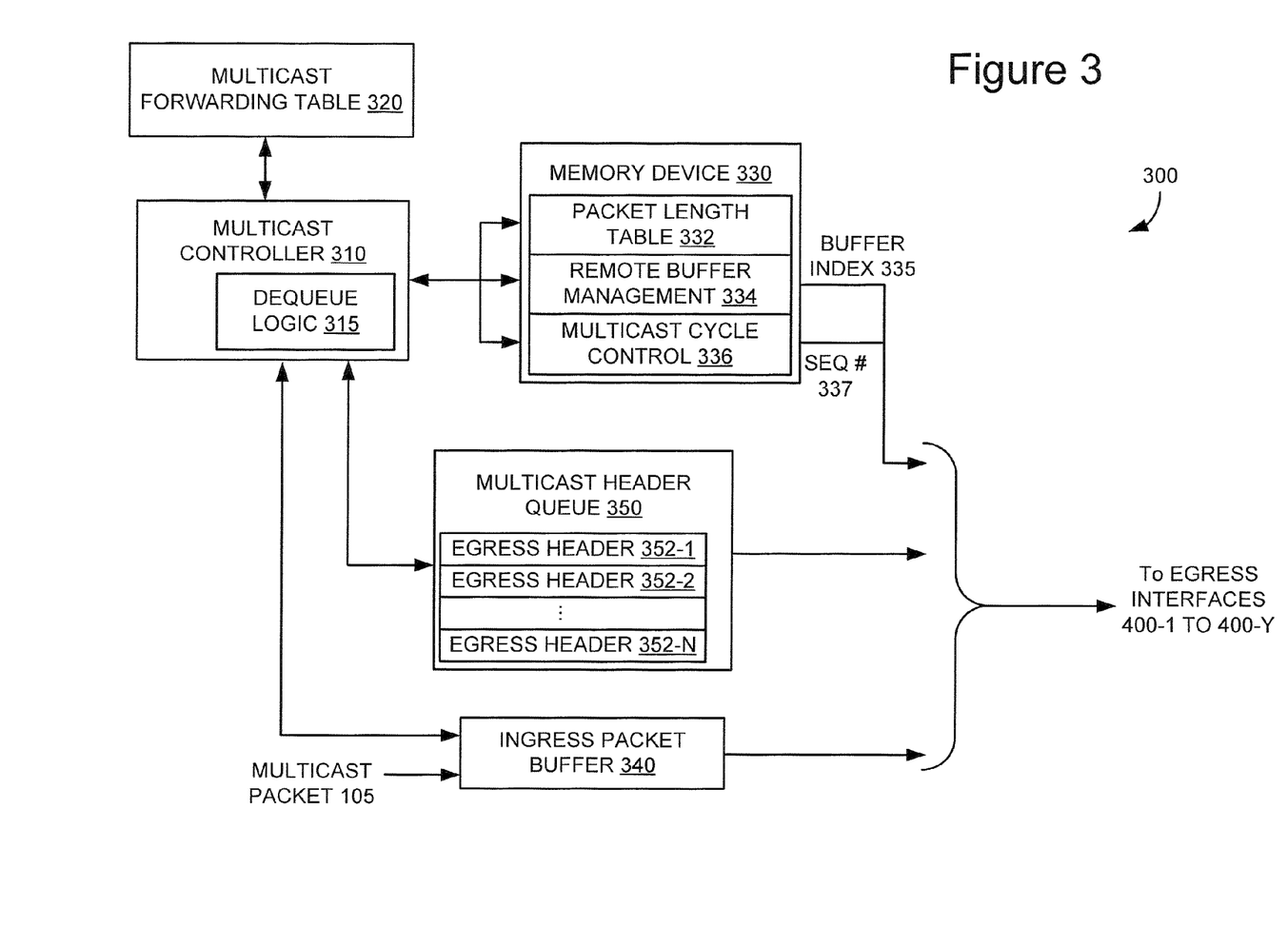
FIGS. 3 and 4 show example embodiments of a central forwarding engine and an egress interface shown in FIG. 2.
Figure 4:
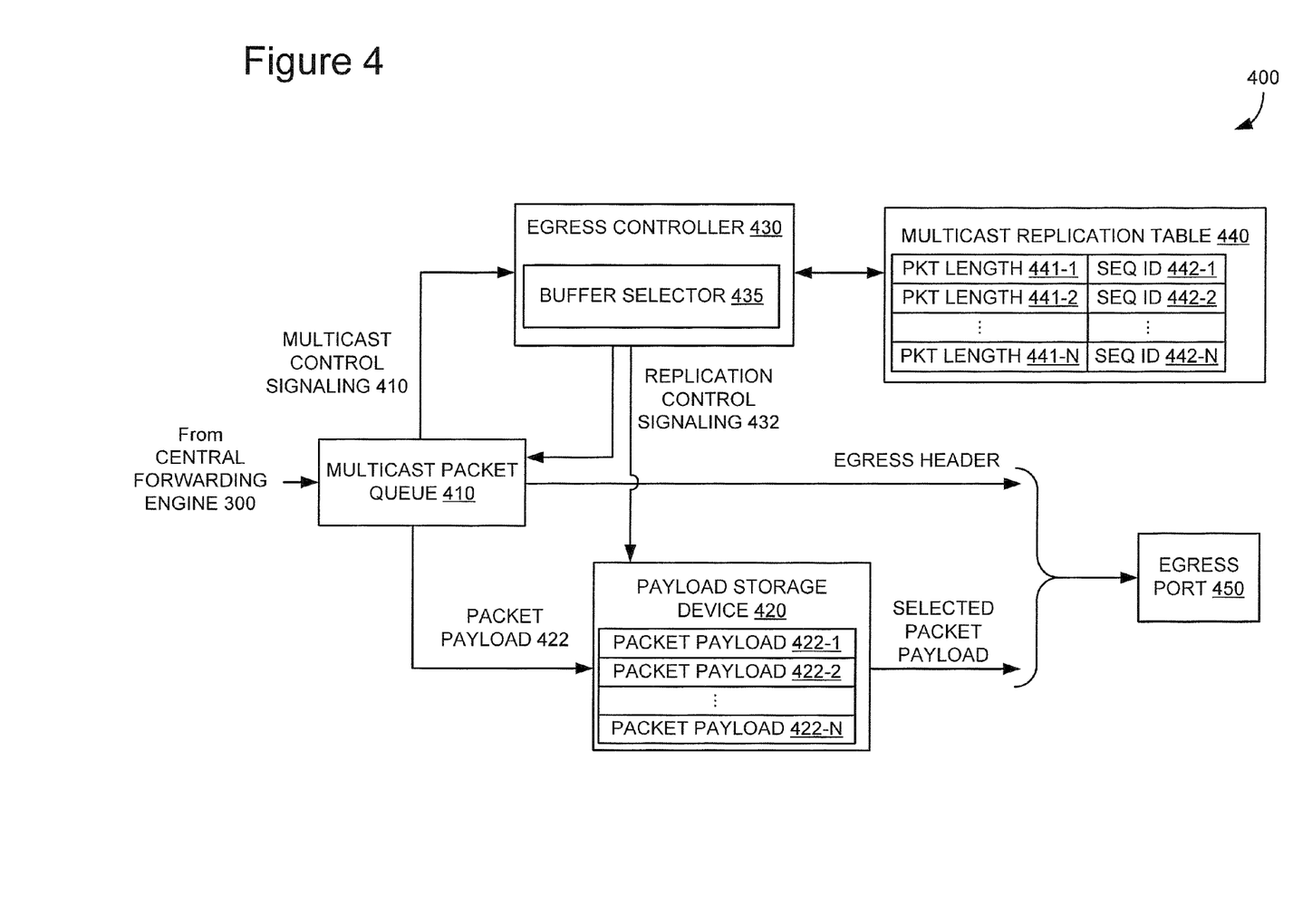

FIGS. 3 and 4 show example embodiments of a central forwarding engine 300 and an egress interface device 400 shown in FIG. 2. Referring to FIG. 3, the central forwarding engine 300 includes an ingress packet buffer 340 to store multicast packets, such as packet 105, received from the network 120 via at least one of the ingress interface devices 202-1 to 202-X.

The central forwarding engine 300 includes a multicast controller 310 to identify which of the egress interface devices 400-1 to 400-Y are to replicate the multicast packet 105 in the ingress buffer 340 and transmit the replicas 107-1 to 107-N towards the multiple recipients 130-1 to 130-N. The multicast controller 310 can identify these egress interface devices 400-1 to 400-Y by reading or extracting information from the ingress packet buffer 340, for example, a multicast destination Internet Protocol (IP) address, and performing a look-up in a multicast forwarding table 320 and find a list of egress interface devices 400-1 to 400-Y, such as a next hop egress link list.

After ascertaining the list of egress interface devices 400-1 to 400-Y, the multicast controller 310 can provide a master copy of the multicast packet 105, together with a buffer index and a sequence number, to the egress interface devices 400-1 to 400-Y on the list. The egress interface devices 400-1 to 400-Y can store the master copy of the multicast packet 105 at a memory location referred by the buffer index with an updated sequence number. The egress interface devices 400-1 to 400-Y can then wait for the central forwarding engine 300 to direct the egress interface devices 400-1 to 400-Y to replicate and transmit the stored multicast packet 105. For instance, as will be described below, the central forwarding engine 300 can generate egress headers that include a sequence number and a buffer index, which directs the egress interface devices 400-1 to 400-Y to retrieve the master copy of the multicast packet 105 and generate the replicas 107-1 to 107-N.

Once the master copy of the multicast packet 105 has been sent to all of the egress interface devices 400-1 to 400-Y on the list, the central forwarding engine 300 can delete or over-write the packet payload from the ingress packet buffer 340. The central forwarding engine 300 can retain the header of the multicast packet 105 for use in subsequent generation of egress headers 352, and can retain a length of the multicast packet 105 to help in modeling traffic to be output from the egress interface devices 400-1 to 400-Y.

The multicast controller 310 can generate one or more egress headers 352-1 to 352-N from the multicast packet 105 (or the retained header of the multicast packet 105) and store them as replica descriptors in the packet queues for the corresponding egress ports modeled at the central packet scheduler. When a replica needs to be dequeued onto an egress port, the multicast controller 310 can transfer the multicast header 352 over the system interconnect 210 to the corresponding egress interface devices, where the reception of the egress headers 352 directs the egress interface device to replicate the multicast packet 105 and transmit the multicast replica to the actual egress port.

The multicast controller 310 can generate one or more egress headers 352-1 to 352-N from the multicast packet 105 (or the retained header of the multicast packet 105) and store them as replica descriptors in a multicast header queue 350. The multicast header queue 350 can include multiple packet queues that correspond to egress ports modeled at the packet scheduler 303. In some embodiments, the multicast header queue 350 can be incorporated into the ingress packet buffer 340.

When a replica of the multicast packet 105 is to be dequeued onto an egress port corresponding to an egress interface device 400-1 to 400-Y, the multicast controller 310 can transfer the multicast header 352 from the multicast header queue 350 over the system interconnect 210 to the egress interface devices 400-1 to 400-Y. Reception of the egress headers 352 by the egress interface devices 400-1 to 400-Y can direct the egress interface devices 400-1 to 400-Y to replicate the multicast packet 105 and transmit the multicast replicas 107-1 to 107-N to the corresponding egress port. By pushing payload replication to the egress interface devices 400-1 to 400-Y, the central forwarding engine 300 can transfer egress headers 352 without the payload over the system interconnect 210, reducing backplane bandwidth consumption and utilization.

The timing of when the multicast controller 310 transfers the egress headers 352-1 to 352-N to the egress interface devices 400-1 to 400-Y can be based on packet scheduling and/or traffic shaping functions performed by the multicast controller 310. These packet scheduling and/or traffic shaping functions can help ensure the replicated multicast traffic injected by the egress interface devices 400-1 to 400-Y does not substantially degrade a quality-of-service over their respective links.

As discussed above, the central forwarding engine 300 can retain a packet length statistic of the multicast packet 105, which allows the multicast controller 310 to delete or overwrite the payload of the multicast packet 105 after it is sent to the appropriate egress interface devices 400-1 to 400-Y and still model traffic to be sent from the egress interface devices 400-1 to 400-Y. The multicast controller 310 can store the packet length in a packet length table 332 of a memory device 330, and reference the packet length table 332 during packet shaping or scheduling activities. This allows the multicast controller 310 the ability to free up buffer memory, i.e., deleting or overwriting the payload, while retaining the ability to properly account for the impact injected multicast traffic will have on links.

The multicast controller 310 includes dequeue logic 315 that can prompt a release of the egress header 352 from the multicast header queue 350 for transfer over the system interconnect 210 to the appropriate egress interface device 400-1 to 400-Y. In some embodiments, the central forwarding engine 300 can wait to provide the multicast packet 105 to the egress interface device 400-1 to 400-Y until the dequeue logic 315 can release an egress header 352 to the same egress interface device 400-1 to 400-Y. In other embodiments, the central forwarding engine 300 can provide the multicast packet 105 to the egress interface device 400-1 to 400-Y immediately without waiting for the dequeue logic 315.

To ensure the egress interface devices 400-1 to 400-Y can associate a received egress header 352 with a previously received master copy of the multicast packet 105, the central forwarding engine 300 can transfer multicast control signaling 311 to the egress interface devices 400-1 to 400-Y along with the multicast packet 105 and the egress headers. The multicast control signaling can include a buffer index 335 to direct the egress interface devices 400-1 to 400-Y to store at least a portion of the multicast packet 105 in a particular buffer location. The multicast controller 310 can select the buffer index number 335 and remotely allocate buffer space in each of the egress interface devices 400-1 to 400-Y to store the multicast packet 105. The multicast controller 310 can access a remote buffer management 334 section of the memory device 330 to identify a free buffer location in a particular egress interface device 400, and allocate the free buffer location to store the multicast packet 105 or to associate an egress header 352 to a master copy of a multicast packet stored in an egress interface device 400.

In some embodiments, the remote buffer management 334 section includes one or more linearly incremented global counters that allow the multicast controller 310 to cycle through a free buffer index associated with a buffer in at least one of the egress interface devices 400-1 to 400-Y. This linearly incremented global counter can have a wrap around time that is sufficiently long enough to cover a maximum time delay associated with performing a multicast replication for a multicast packet. In other words, the counter linearly allocates space in a buffer of at least one of the egress interface devices 400-1 to 400-Y and the counter wraps around or resets according to the size of the buffer.

The multicast control signaling can include a sequence number 337 to identify a replication cycle or traffic flow associated with the multicast packet 105. The replication cycle refers to the operations performed by the edge routing device 200 to generate replicas of the multicast packet 105 and for the replicas 107-1 to 107-N to be transmitted from the edge routing device 200.

The memory device 330 can include a multicast cycle control 336 that allows the multicast controller 310 to select a sequence number 337 for newly received multicast packets or to relate an egress header 352 to an existing replication cycle. When a new multicast packet is received, a different sequence number 337 can be assigned to the new multicast packet. For instance, a sequence number used by a previously received multicast packet can be incremented, indicating to any egress interface device 400 receiving the sequence number that the multicast packet belongs to a particular replication cycle.

The multicast controller 310 can direct an incorporation of multicast control signaling into the egress header 352 or multicast packet 105. For instance, the multicast controller 310 can extend the egress header 352 from the multicast header queue 350 (or a header of the multicast packet 105 in the ingress packet buffer 340) to include a buffer index 335 and sequence number 337 from the memory device 330. As discussed above, the inclusion of the buffer index 335 and sequence number 337 in the egress header 352 and multicast packet 105 can help the egress interface devices 400-1 to 400-Y associate egress headers 352 with stored multicast packets 105 during replication and transmission operations.

Referring to FIG. 4, an example egress interface device 400 includes a multicast packet queue 410 to receive packetized information, such as a multicast packet 105 or egress headers 352 both possibly including multicast control signaling, from the central forwarding engine 300. The egress interface device 400 includes an egress controller 430 to determine whether the multicast packet queue 410 includes a multicast packet 105 for a new replication cycle or whether the multicast packet queue 410 includes an egress header 352 corresponding to a previous stored multicast packet 105.

When the multicast packet queue 410 includes a full multicast packet 105, the egress controller 430 can store the payload 422 of the packet 105 into a payload storage device 420 according to the buffer index in the multicast control signaling. This packet storage can overwrite or delete the previously data stored at the buffer index.

The egress controller 430 can read the multicast control signaling (and possibly a packet length field) from the multicast packet queue 410 and store the multicast control signaling (and possibly a packet length field) in a multicast replication table 440. The multicast replication table 440 can be arranged in various configurations, for instance, as shown in FIG. 4, the multicast replication table 440 stores sequence numbers 442 and packet lengths 441, which are indexable by the buffer index in the multicast control signaling.

In some embodiments, a buffer selector 435 in the egress controller 430 can determine that the received multicast packet 105 is an indication from the central forwarding engine 300 to immediately replicate the multicast packet 105 and forward the replica 107 towards a destination endpoint identified in the header. The buffer selector 435 can provide replication control signaling to the multicast packet queue 410 and possibly the payload storage device 420, directing a copy of the multicast packet to an egress port 450 for output from the egress interface device 400.

When the multicast packet queue 410 includes an egress header 352, the egress controller 430 can read the multicast control signaling (and possibly a packet length field) from the multicast packet queue 410 and retrieve a packet length 441 and a sequence number 442 corresponding to the buffer index in the multicast control signaling. A buffer selector 435 in the egress controller 430 can compare the retrieved packet length 441 and sequence number 442 with the packet length and sequence number from the multicast packet queue 410.

When the sequence numbers (and packet lengths) match, the buffer selector 435 can provide replication control signaling to the multicast packet queue 410 and payload storage device 420, directing an output of the egress header stored in the multicast packet queue 410 and a packet payload associated with egress header to an egress port 450. The egress header and the selected packet payload can be combined or concatenated to form a replication 107 of the multicast packet 105. The multiplexer 107 can output the replicated multicast packet 107 towards at least one multicast recipient 130 over a data link. When the sequence numbers (and packet lengths) do not match, the egress controller 430 can indicate that an error condition has occurred and drops the egress header from the multicast packet queue 410 without replication. In some embodiments, when the sequence numbers (and packet lengths) do not match, the egress controller 430 can indicate a previous replication cycle has completed and a new replication cycle has begun.

Figure 5A:
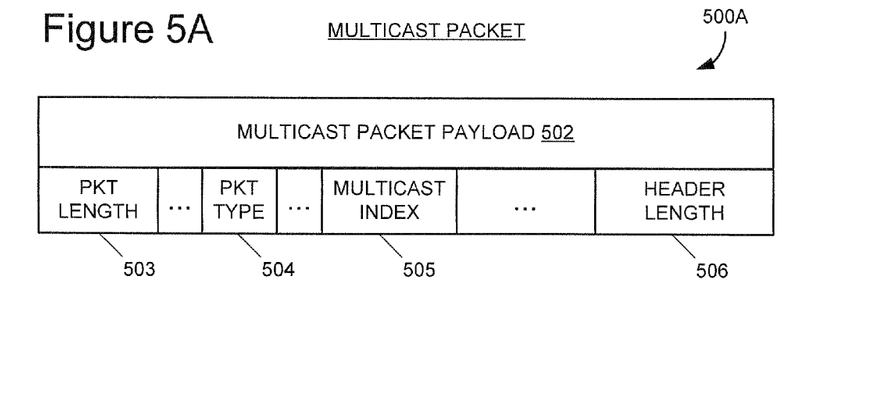
FIGS. 5A-5C show example embodiments of multicast control signaling utilized by the multicast-enabled edge router.
Figure 5B:
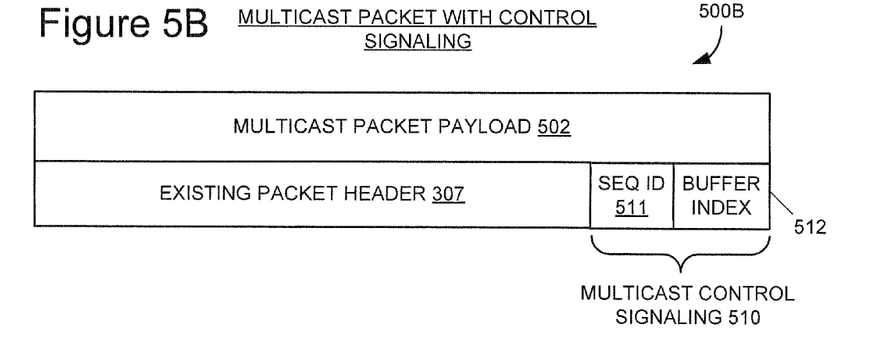
Figure 5C:
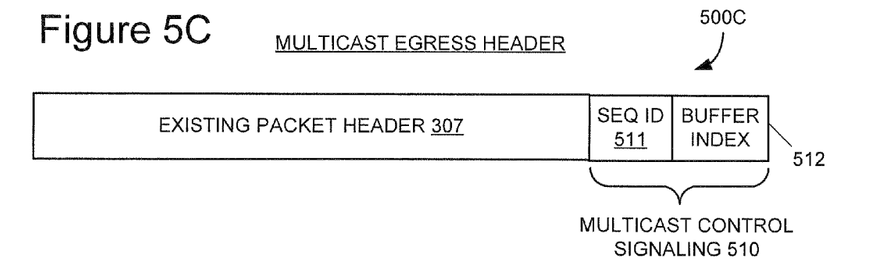

FIGS. 5A-5C show example embodiments of multicast control signaling utilized by the multicast-enabled edge router. Referring to FIGS. 5A-5C, a partial datagram 500A for a multicast packet that does not include multicast control signaling. The datagram 500A include a payload 502 and various header fields, including a packet length field 503, packet type field 504, a multicast index 505, and a (DOCSIS) header length field 506. Another datagram 500B shows a multicast packet having an existing packet header 507 that is extended to include multicast control signaling 510. The multicast control signaling 510 includes a sequence identification number 511 and a buffer index number 512 that can be utilized by the edge routing device 200 to distribute multicast packet replication, while retaining centralized packet scheduling and traffic shaping functionality. Datagram 500C shows an egress header having the existing packet header 507 that is extended to include multicast control signaling 510. Similar to datagram 500B, the multicast control signaling 510 includes a sequence identification number 511 and a buffer index number 512.

Figure 6:
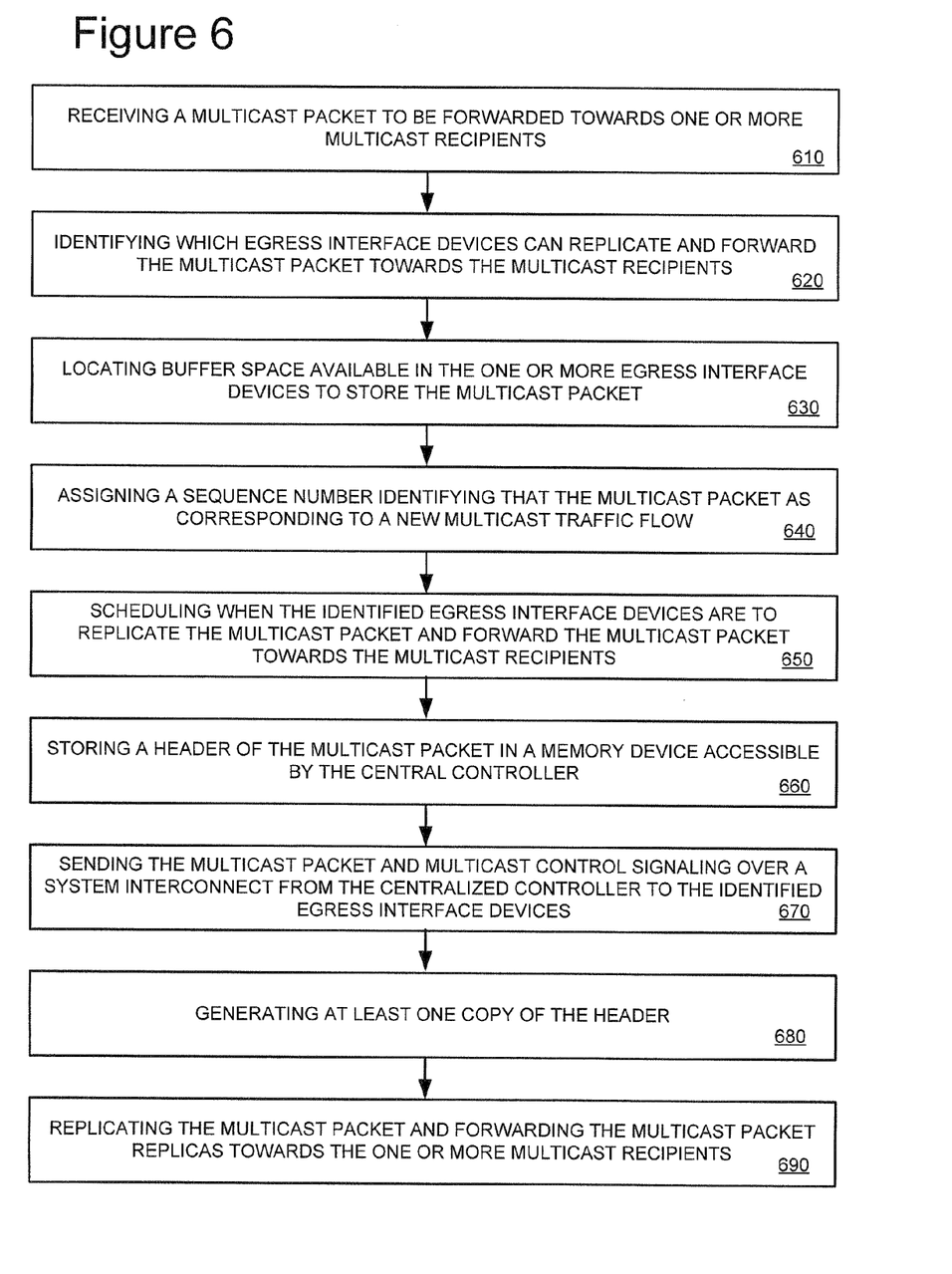
FIG. 6 shows example flowchart embodiments for the operation of the central forwarding engine shown in FIG. 3 and the egress interface shown in FIG. 4.

FIG. 6 shows example flowchart embodiments for the operation of the edge routing device shown in FIG. 2. Referring to FIG. 6, in a block 610, an edge routing device 200 receives a multicast packet to be forwarded towards one or more multiple recipients. The multicast packet can be received by an ingress interface device and transferred to a central controller over a system interconnect.

In a block 620, the edge routing device 200 identifies which egress interface devices can replicate and forward the multicast packet towards the multiple recipients. The central controller can perform a multicast IP lookup to identify the egress interface devices that are to receive a copy of the multicast packet.

In a block 630, the edge routing device 200 locates buffer space available in the one or more egress interface devices to store the multicast packet. The buffer space can be located by looking up or selecting a free buffer in the egress interface devices. The central controller can keep track of which buffers are free in the egress interface devices in a variety of ways, and remotely allocate the outbound interface buffers by selecting a free buffer and including the selection in multicast control signaling.

In a block 640, the edge routing device 200 assigns a sequence number identifying that the multicast packet as corresponding to a new multicast traffic flow. The central controller can keep track of various multicast replication cycles through the use of sequence numbers that can be linearly incremented when a new multicast packet is received. The sequence number for a newly received multicast packet can be included in multicast control signaling.

In a block 650, the edge routing device 200 schedules when the identified egress interface devices are to replicate the multicast packet and forward the multicast packet towards the multiple recipients. The central controller can utilize information about outgoing data links and packet traffic to be transmitted over the data links to determine when to allow egress interface devices to forward replicated multicast packets over the data links.

In a block 660, the edge routing device 200 stores a header of the multicast packet in a memory device accessible by the central controller. In a block 670, the edge routing device 200 sends the multicast packet and multicast control signaling over a system interconnect from the centralized controller to the identified egress interface devices. In a block 680, the edge routing device 200 generates at least one copy of the header with the central controller. The storage of the header allows the central controller to subsequently generate the copy of the header. The header can also include the multicast control signaling, which can be utilized by the outbound interface to associate the header with the previously sent multicast packet.

In a block 690, the edge routing device 200 replicates the multicast packet and forwards the multicast packet replicas towards the one or more multiple recipients based on the scheduling. The replication can be performed by concatenating the copy of the header with the payload of the previously transferred multicast packet.

It will be apparent to those having skill in the art that many changes can be made to the details of the above-described embodiments without departing from the underlying principles. For instance, those skilled in the art will appreciate that they can perform the functions shown in the flowchart in any order, the functions can be combined, divided, and deleted, and new functions or blocks can be added to the flowchart. The scope of the present disclosure should, therefore, be determined only by the following claims.

Most of the equipment discussed above comprises hardware and associated software. For example, the typical networking device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments may include executable programs or instructions that are stored in machine-readable or computer-readable storage media, such as a digital memory. We do not imply that any specific type of computer is required. For example, various processors, embedded or otherwise, may be used in equipment such as the components described herein. The term circuitry used herein can refer to any of the hardware used to execute a program or routine, or to any hardware that can be used to implement the principles described herein independently of software.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there will typically be a corresponding software product at the transmitting end of the transmission, or the receiving end, or both.

One of skill in the art will recognize that the concepts taught herein can be tailored to a particular application in many other advantageous ways. In particular, those skilled in the art will recognize that the illustrated embodiments are but one of many alternative implementations that will become apparent upon reading this disclosure.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

Having described and illustrated a particular example, it should be apparent that the embodiments of the invention can be modified in arrangement and detail without departing from such principles. We claim all modifications and variations coming within the spirit and scope of the following claims.

The invention claimed is:

1. A system comprising:
a forwarding engine to schedule when replicas of a received multicast packet are forwarded towards one or more multicast recipients; and
an egress interface device to replicate the multicast packet and forward the multicast packet replicas towards the one or more multicast recipients when prompted by the forwarding engine based on the schedule determined by the forwarding engine wherein the forwarding engine is configured to send a payload of the multicast packet and multicast control signaling to the egress interface device over a system interconnect when a first replication header is dequeued for an egress link on the egress interface device, and wherein the egress interface device is configured to generate replicas of the multicast packet responsive to the multicast control signaling.

2. The system of claim 1, wherein the forwarding engine is configured to generate one or more copies of a header in the multicast packet and to send the copies of the header to the egress interface device over the system interconnect, wherein the egress interface device is configured to generate replicas of the multicast packet by concatenating the one or more copies of the header with the payload of the multicast packet.

3. The system of claim 2, wherein the forwarding engine is configured to extend the copies of the header to include a buffer index and a sequence number, wherein the egress interface device is configured to locate the payload and associate the copies of the header with the payload according to the buffer index and the sequence number.

4. The system of claim 2, wherein the forwarding engine is configured to control a timing of when the egress interface device forwards the multicast packet replicas towards the one or more multicast recipients through one or more egress links according to when the copies of the header are sent to the egress interface device.

5. The system of claim 1, wherein the forwarding engine is configured to send the payload of the multicast packet to the egress interface device after one or more egress links have been identified on the egress interface device for receiving the multicast packet replicas.

6. The system of claim 1, wherein the forwarding engine is configured to represent each multicast packet replica with a replication header encoded with multicast control signaling, and send the replication header to the egress interface device when the forwarding engine has scheduled at least one replica multicast packet to be forwarded towards the one or more multicast recipients.

7. A method comprising:
receiving a multicast packet to be forwarded towards one or more multicast recipients;
scheduling, with a centralized controller, when one or more egress interface devices are to forward replicas of the multicast packet towards the one or more multicast recipients;
locating, with the centralized controller, buffer space available in the one or more egress interface devices to store the multicast packet, wherein a buffer index in multicast control signaling identifies the buffer space available for the multicast packet to be stored in the one or more egress interface devices;
sending a master copy of the multicast packet and the multicast control signaling over a system interconnect from the centralized controller to the one or more egress interface devices; and
replicating, with the one or more egress interface devices, the multicast packet and forwarding the multicast packet replicas towards the one or more multicast recipients based on the scheduling and in response to the multicast control signaling.

8. The method of claim 7 further comprises:
storing a header of the multicast packet in a memory device accessible by the centralized controller;
generating, with the central controller, a replication header for each multicast packet replica to be generated by the egress interface device; and
sending the replication header to the egress interface device over the system interconnect, wherein the replicating of the multicast packet is performed by copying the master copy of the multicast packet retrieved with the information derived from the multicast control signaling.

9. The method of claim 7 further comprises incrementing a sequence number for each incoming multicast packet to be replicated, wherein the sequence number is carried in all replication headers corresponding to the multicast packet, and wherein the one or more egress interface devices are configured to identify a start of a replication cycle and associate replication headers with the master copy of the multicast packet according to the sequence number and the buffer index.

10. The method of claim 7, wherein the one or more egress interface devices are configured to detect a loss of a master copy of the multicast packet when the sequence number in the replication header is different than a sequence number stored according to the buffer index.

11. The method of claim 10 further comprises discarding the replication header when the loss of the master copy is detected.

12. A computer-readable memory device storing instructions that, in response to execution by a processing device, cause the processing device to perform operations comprising:
scheduling when one or more egress interface devices are to forward replicas of a received multicast packet towards one or more multicast recipients; and
storing a header of the multicast packet in a memory device accessible by the processing device;
sending the multicast packet to the one or more egress interface devices;
generating a replication header for each multicast packet replica to be generated by the one or more egress interface devices; and
sending the replication header and multicast control signaling to the one or more egress interface devices, wherein the one or more egress interface devices are configured to replicate the multicast packet retrieved with information derived from the multicast control signaling and to forward the multicast packet replicas towards the one or more multicast recipients based on the scheduling.

13. The computer-readable memory device of claim 12, wherein the instruction are configured to cause the processing device to perform operations further comprising locating buffer space available in the one or more egress interface devices to store the multicast packet, wherein a buffer index in the multicast control signaling identifies the buffer space for the one or more egress interface devices to store the multicast packet.

14. The computer-readable memory device of claim 12, wherein the instruction are configured to cause the processing device to perform operations further comprising assigning a different sequence number for each incoming multicast packet to be replicated, wherein the sequence number is carried in replication headers corresponding to the multicast packet, and wherein the one or more egress interface devices are configured to identify a start of a replication cycle and associate replication headers with a master copy of the multicast packet according to the sequence number and a buffer index.

15. The computer-readable memory device of claim 14, wherein the one or more egress interface devices are configured to detect a loss of the master copy of the multicast packet when the sequence number in the replication header is different than a sequence number stored according to the buffer index, and wherein the instruction are configured to cause the processing device to perform operations further comprising discarding the replication header when the loss of the master copy is detected.

* * * * *